United States Patent
Veillette

(10) Patent No.: US 8,867,235 B2
(45) Date of Patent: Oct. 21, 2014

(54) CONFIGURABLE CONDUIT BODY

(75) Inventor: Marc-Antoine Veillette, Ange-Gardien (CA)

(73) Assignee: Thomas & Betts International, Inc., Wilmington, DE (US)

( * ) Notice: Subject to any disclaimer, the term of this patent is extended or adjusted under 35 U.S.C. 154(b) by 220 days.

(21) Appl. No.: 12/944,872

(22) Filed: Nov. 12, 2010

(65) Prior Publication Data
US 2011/0120582 A1    May 26, 2011

Related U.S. Application Data

(60) Provisional application No. 61/264,401, filed on Nov. 25, 2009.

(51) Int. Cl.
*H02B 1/20*    (2006.01)
*H02G 3/08*    (2006.01)

(52) U.S. Cl.
CPC ............... *H02G 3/086* (2013.01); *H02G 3/083* (2013.01)
USPC ........... 361/826; 174/561; 174/559; 174/560; 361/657

(58) Field of Classification Search
USPC ........... 138/109; 220/3.2–3.9, 4.02, 241, 242; 206/305, 307, 308.1; 361/120, 215, 361/218, 641, 657, 816, 817, 826; 174/10, 174/17 R, 17.05, 17.06, 17.08, 19, 20, 21 R, 174/22 R, 30–31.5, 60, 50, 50.5, 50.6, 174/50.63, 535, 542, 543, 559–564, 101, 174/153 G, 152 G, 656, 659, 663, 660, 661, 174/666, 668, 669, 66, 67, 68.3, 70 R, 72 C, 174/95–97, 68.1, 480, 481, 53, 57, 58
See application file for complete search history.

(56) References Cited

U.S. PATENT DOCUMENTS

| 706,974 A | 8/1902 | Lyle |
| 802,577 A | 10/1905 | Lyle |
| 1,131,399 A | 3/1915 | McGinley |

(Continued)

FOREIGN PATENT DOCUMENTS

EP    1587196 A1    10/2005

OTHER PUBLICATIONS

Office Action issued in corresponding Canadian application No. 2,721,529, dated Dec. 3, 2012; 2 pages.

*Primary Examiner* — Lisa Lea Edmonds
*Assistant Examiner* — Christopher L Augustin
(74) *Attorney, Agent, or Firm* — Snyder, Clark, Lesch & Chung, LLP

(57) ABSTRACT

A conduit body may include a body including a side and a bottom to form a cavity. The side of the body may include an outer surface and a recessed surface forming grooves. The conduit body may include a hub that includes an annular tube forming an opening to receive a cable. The body may be configured to receive the edges of the hub in the grooves such that movement of the hub in a linear direction may move the hub through the grooves to couple the hub to the body. When the hub is coupled to the body using the grooves, the conduit body may be configured to receive the cable through the annular tube of the hub and through the opening in the recessed surface into the cavity.

20 Claims, 16 Drawing Sheets

(56) References Cited

U.S. PATENT DOCUMENTS

| | | |
|---|---|---|
| 1,456,385 A | 5/1923 | Kvarnstrom |
| 1,979,804 A | 11/1934 | Lutz |
| 3,573,344 A | 4/1971 | Snyder |
| 3,622,029 A | 11/1971 | Ware |
| 4,103,101 A | 7/1978 | Maier |
| 4,438,859 A * | 3/1984 | Solek ............................ 220/3.2 |
| 4,959,506 A | 9/1990 | Petty et al. |
| 5,378,854 A * | 1/1995 | Hoover ........................... 174/53 |
| 5,728,971 A * | 3/1998 | Nash .......................... 174/50.52 |
| 6,057,509 A | 5/2000 | Simmons |
| 6,229,087 B1 | 5/2001 | Archer |
| 6,278,058 B1 | 8/2001 | Anderson |
| 6,768,054 B2 * | 7/2004 | Sato et al. ...................... 174/50 |
| 6,838,615 B2 | 1/2005 | Pyron |
| 6,903,272 B2 | 6/2005 | Dinh |
| 7,193,153 B2 * | 3/2007 | Hemingway et al. ........... 174/58 |
| 7,227,085 B1 * | 6/2007 | Gretz ........................... 174/481 |
| 7,709,733 B1 * | 5/2010 | Plankell ......................... 174/50 |
| 2002/0068472 A1 | 6/2002 | Pyron |
| 2003/0136780 A1 * | 7/2003 | Sato et al. ..................... 220/3.8 |
| 2006/0207783 A1 * | 9/2006 | Lammens et al. ............... 174/58 |
| 2007/0007498 A1 | 1/2007 | Pyron |
| 2009/0126988 A1 | 5/2009 | Pyron |
| 2009/0223958 A1 | 9/2009 | Pyron |

* cited by examiner

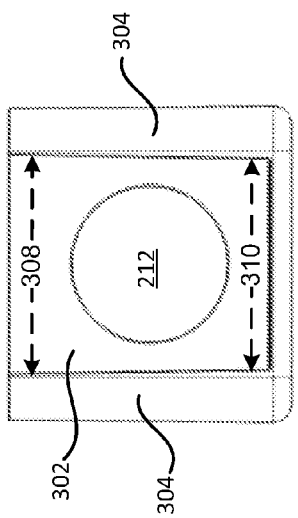
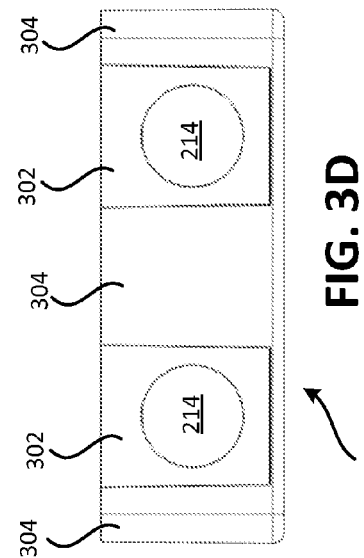
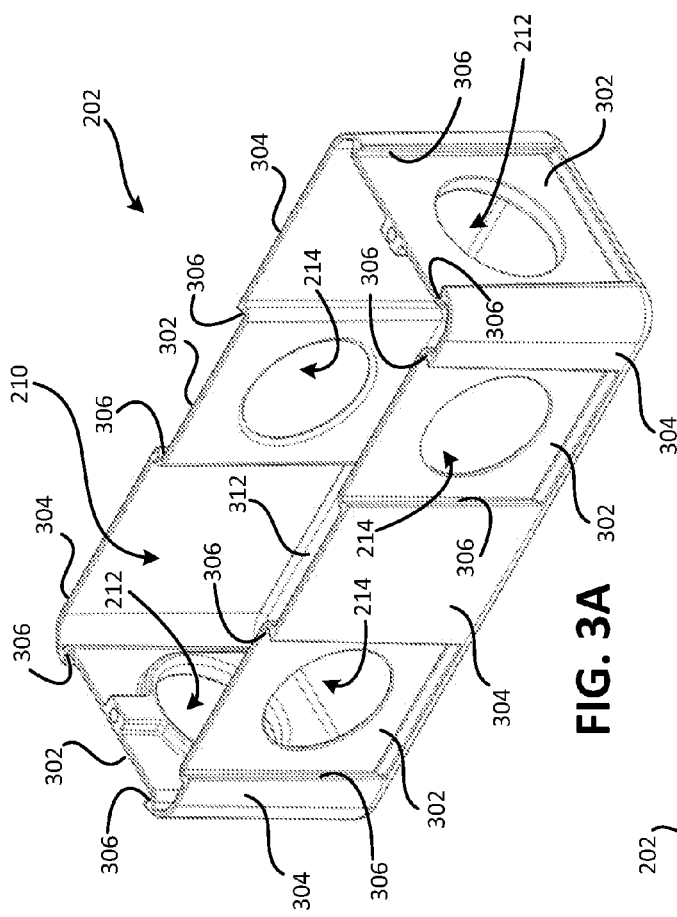
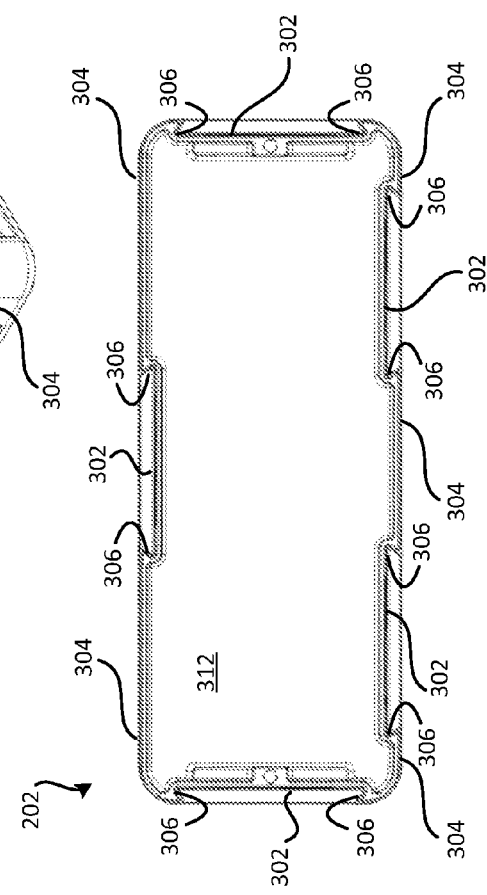

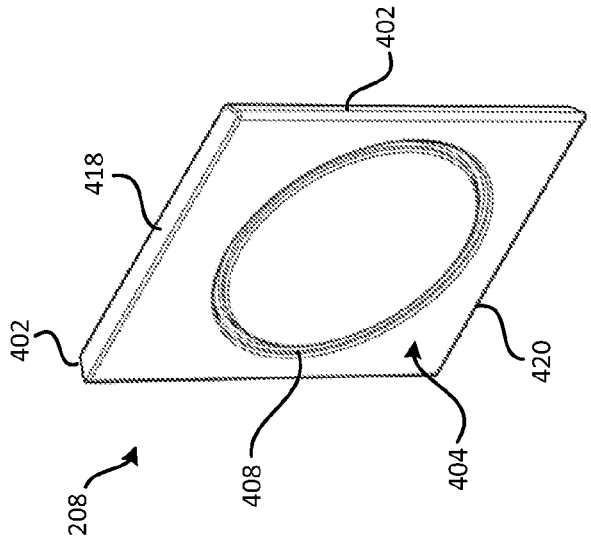
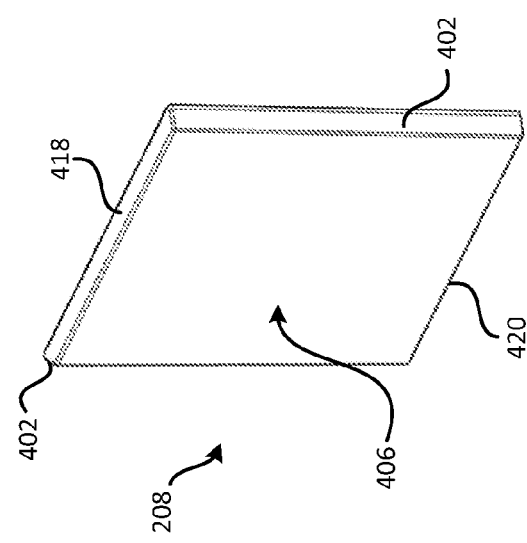
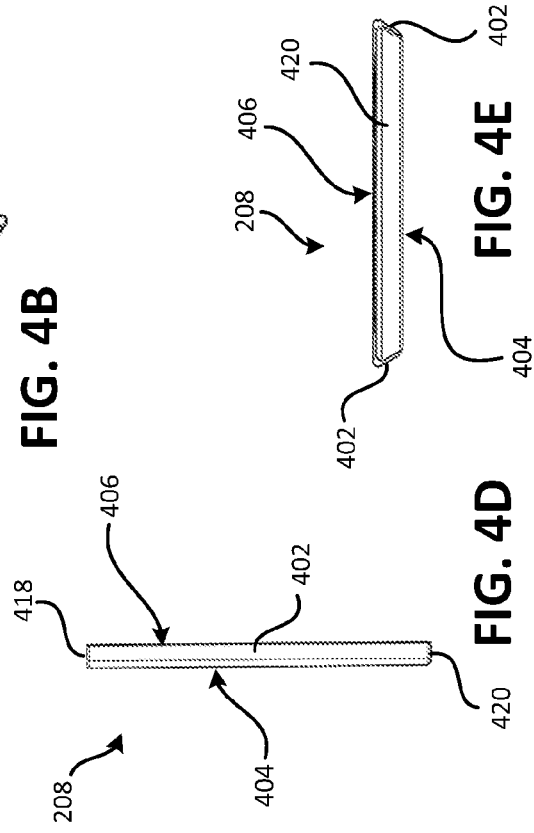
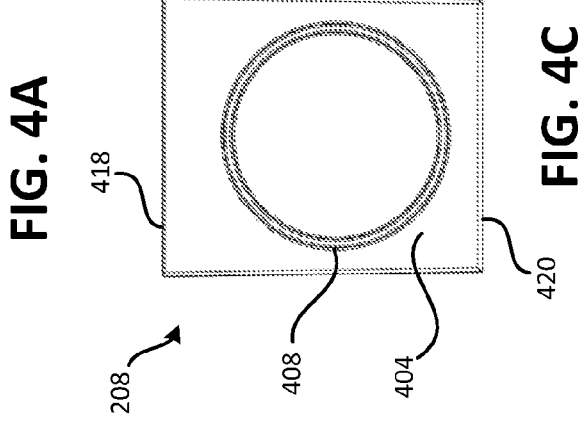
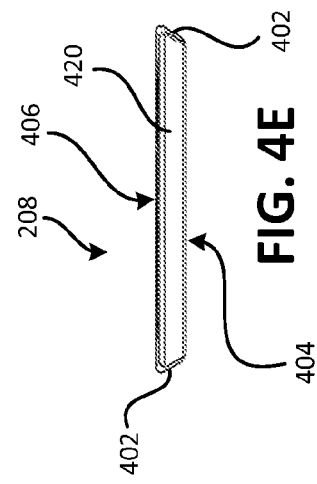

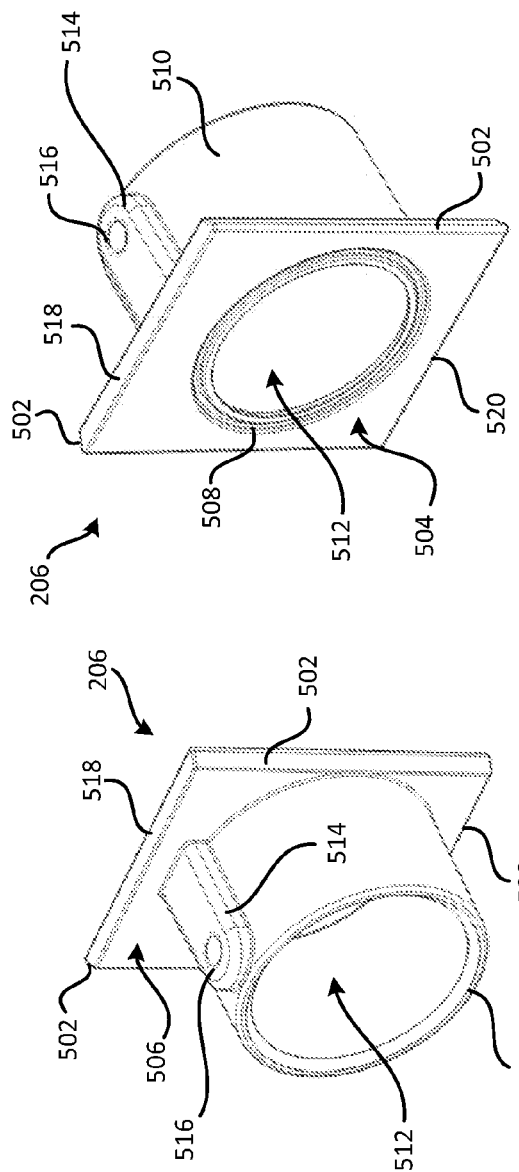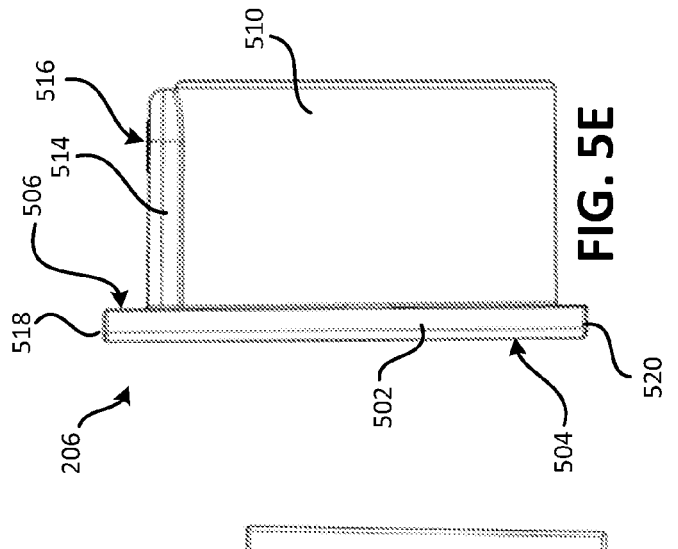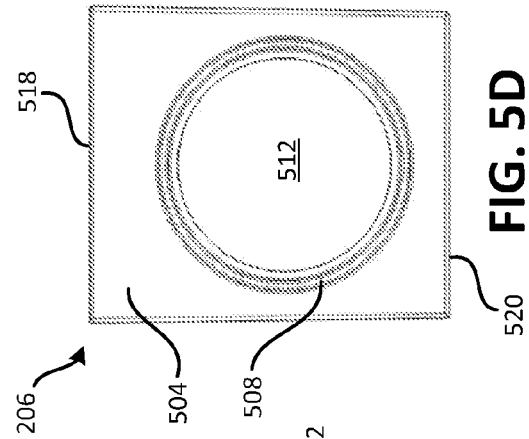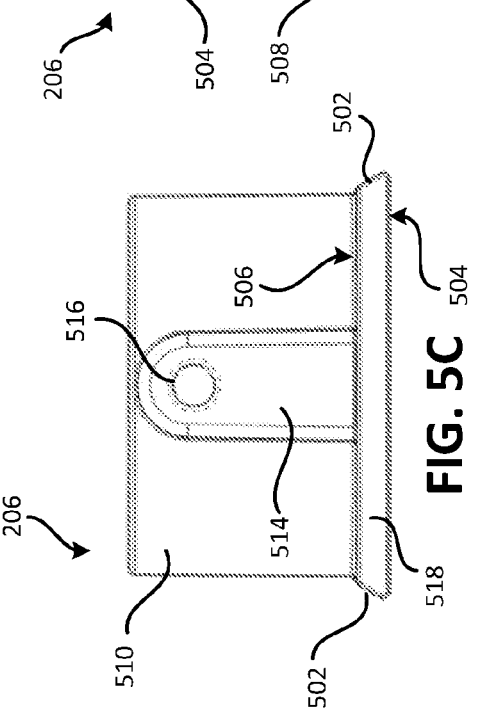

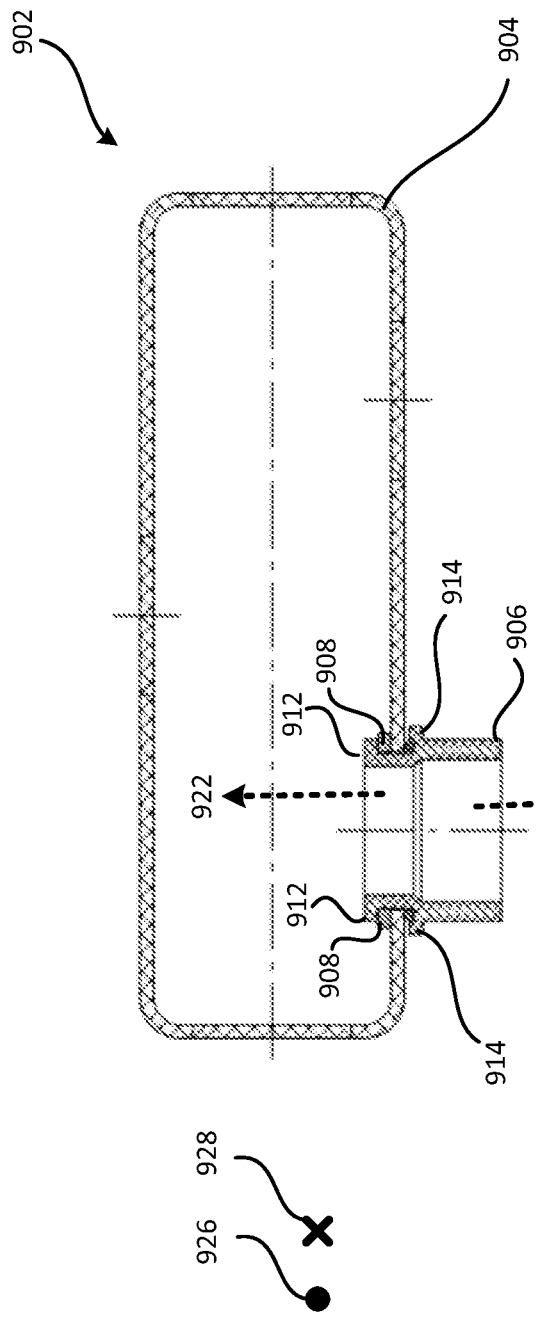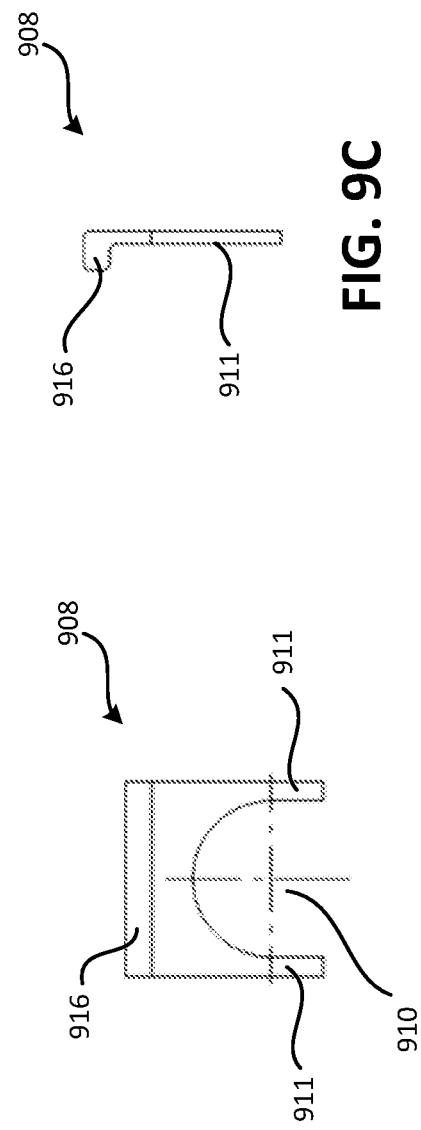

CONFIGURABLE CONDUIT BODY

RELATED APPLICATIONS

This application claims the benefit of provisional U.S. Patent Application No. 61/264,401, filed Nov. 25, 2009, which is incorporated herein by reference.

BACKGROUND OF THE INVENTION

Electrical conduit systems are often used in homes and commercial buildings to safely provide electric power. These conduit systems may include long runs of rigid conduits for housing wires. The conduits, which may be constructed of a rigid metal pipe, provide a protective cover for the wires. Conduit "bodies" may be installed in the conduit systems at locations to provide accesses to the wires in the conduits, or to route the wires through a bulkhead, an electrical equipment enclosure, a junction box, or another electrical fixture.

BRIEF DESCRIPTION OF THE DRAWINGS

FIGS. 3A through 3D are projection drawings of the body portion of the conduit bodies shown in FIGS. 2A through 2D;

FIGS. 4A through 4E are projection drawings of the cover plate of the conduit bodies shown in FIGS. 2A through 2D;

FIGS. 5A through 5E are projection drawings of the hub portion of the conduit bodies shown in FIGS. 2A through 2D;

FIGS. 9A through 9C are cross-sectional and projection drawings of a hub portion, a body portion, and a clip of a conduit body in another embodiment.

DETAILED DESCRIPTION OF THE PREFERRED EMBODIMENTS

FIGS. 1A through 1D are projection drawings of exemplary conduit bodies in different configurations, e.g., "go-forward" configuration 102A, a "T" configuration 102B, a "turn-left" configuration 102C, and a "turn-right" configuration 102D. Embodiments described herein may allow for a conduit body to be configured as shown in any of configurations 102A through 102D or to be reconfigured from any of the configurations 102A-102D into any other one of configurations 102A-102B.

Each of configurations 102A-102D may include a housing 104 (e.g., an elongated housing). Housing 104 may be hollow to allow electrical connections to be made inside housing 104, for example, by removing the top plate (described below).

Each configuration 102A-102D may also include two or more cylindrical hubs 106. Hubs 106 may be annular in shape and may extend outward from housing 104. Electrical wires (not shown) may pass through hubs 106 into housing 104 from outside housing 104. Hubs 106 may also couple to a rigid tubular conduit (not shown) that pass the electrical wires to hubs 106.

Figure 1A:
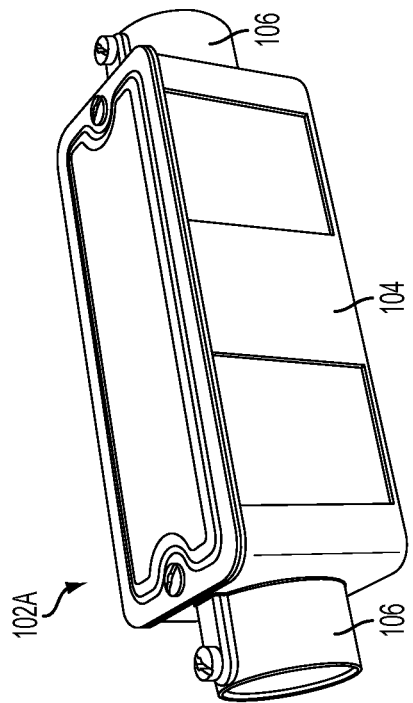
FIGS. 1A through 1D are projection drawings of exemplary conduit bodies in different configurations.
Figure 2A:
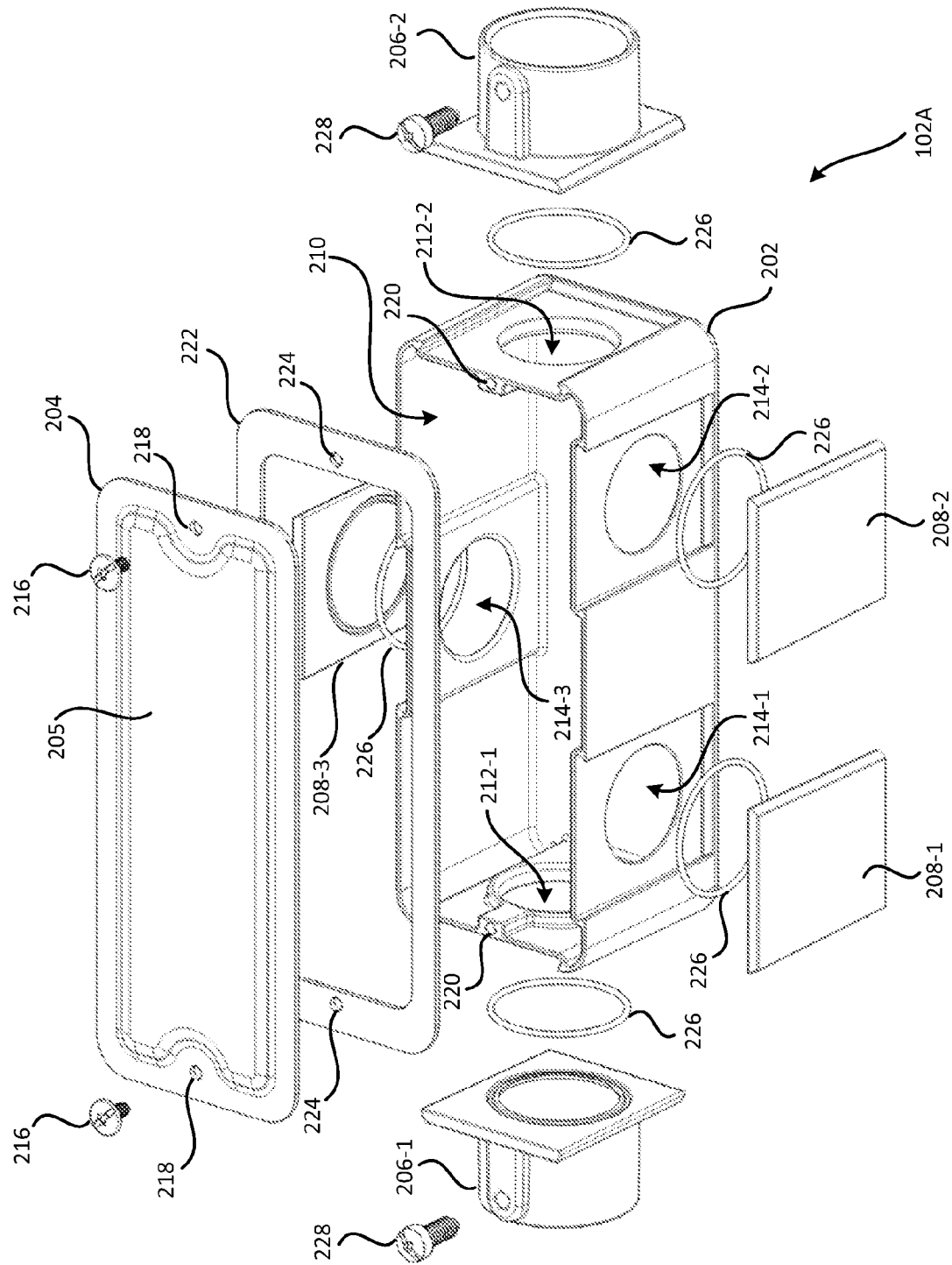
FIGS. 2A through 2D are projection drawings of the exemplary conduit bodies of FIGS. 1A through 1D.

FIG. 2A is a projection drawing of the exemplary conduit body, in an unassembled state, in pass-forward configuration 102A of FIG. 1A. As shown in FIG. 2A, the conduit body may include a body portion 202, a top plate 204, hub portions 206 (e.g., hub portion 206-1 and hub portion 206-2), and cover plates 208 (e.g., cover plates 208-1 through 208-3). Hub portions 206 and cover plates 208 may at times be individually referred to as "hub portion 206" and "cover plate 208," respectively.

Body portion 202 may be generally rectangular with four sides and a bottom that define a cavity. Other shapes for body portion 202 are possible, such as circular or oval. Body portion 202 may include a number of openings, e.g., a top opening 210, two end openings 212-1 and 212-2 (collectively referred to as end openings 212), and three side openings 214-1, 214-2, and 214-3 (collectively referred to as side openings 214). In the embodiment of FIG. 2A, end openings 212-1 and 212-2 may be on opposite ends of body portion 202. One side of body portion 202 may include side openings 214-1 and 214-2 and the opposite side may include side opening 214-3.

Top plate 204 may cover top opening 210 of body portion 202. Without top plate 204, for example, an operator may access the cavity of body portion 202 through top opening 210 to connect electrical wires inside body portion 202. Top plate 204 may include a raised portion 205, which may provide rigidity along the length and width of top plate 204.

In the configuration shown in FIG. 2A, hub portions 206-1 and 206-2 may each couple to the ends of body portion 202 and may cooperate with end openings 212-1 and 212-2, respectively. Also in this configuration, cover plates 208-1, 208-2, and 208-3 may couple to body portion 202 to cover side openings 214-1, 214-2, and 214-3, respectively. The coupling of hub portions 206 and cover plates 208 to body portion 202 is described in further detail with respect to FIGS. 6A through 6C.

Top plate 204 may be secured to body portion 202 with screws 216, which may pass through screw holes 218 in top plate 204 and into screw holes 220 of body portion 202. Screws 216 may engage screw holes 220 (e.g., a threading engagement) to secure top plate 204 to body portion 202. A gasket 222 may be placed between top plate 204 and body portion 202 to provide a seal (e.g., a water-tight seal) between top plate 204 and body portion 202. Gasket 222 may include screw holes 224 that line up with screw holes 218 and screw holes 220 for passing screws 216. As such, screws 216 may secure and compress gasket 222 between top plate 204 and body portion 202.

O-rings 226 may be situated between cover plates 208 and hub portions 206 to provide a seal (e.g., a water-tight seal) between cover plates 208 and body portion 202 and between hub portions 206 and body portion 202. Screws 228 may secure tubular conduits (not shown) to hubs 206.

Figure 1D:
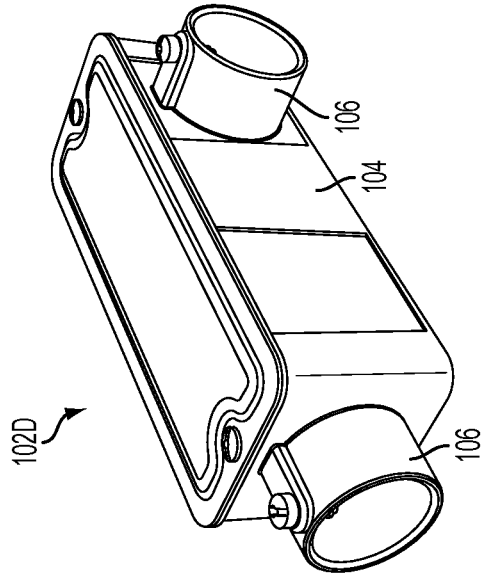
Figure 1B:
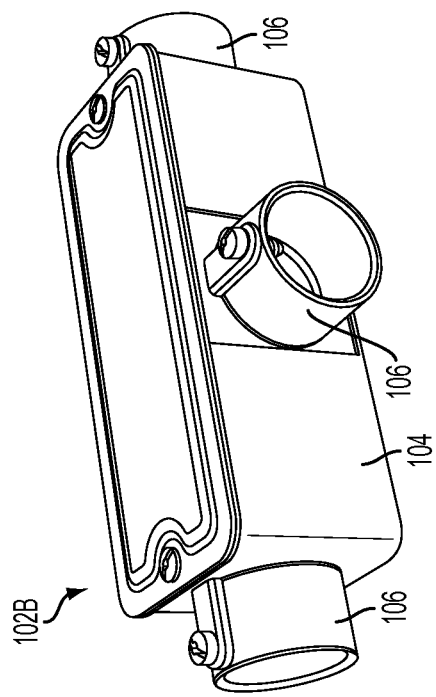
Figure 2B:
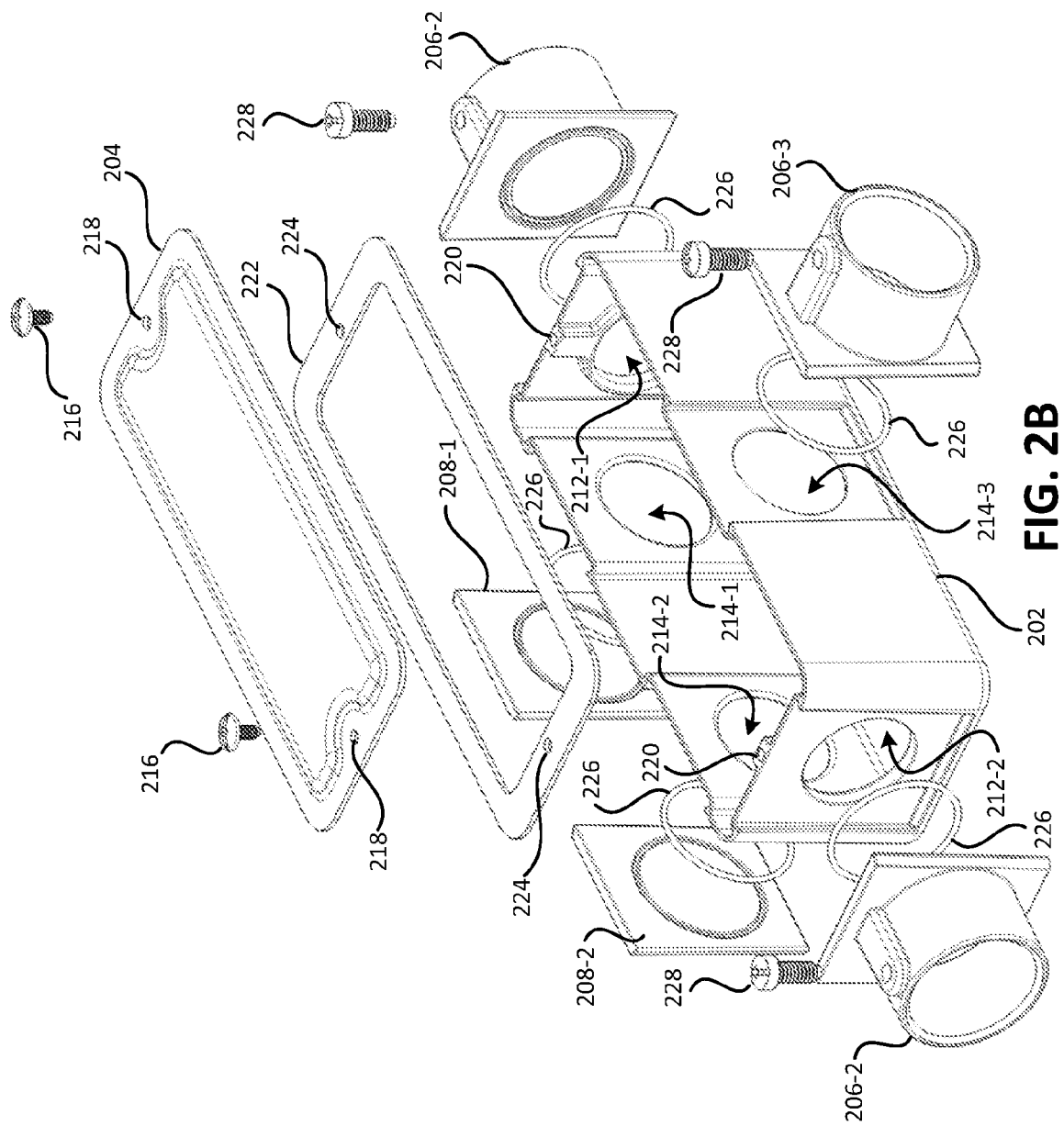

FIG. 2B is a projection drawing of the exemplary conduit body, in an unassembled state, in T configuration 102B of FIG. 1B. T configuration 102B is similar to pass-forward configuration 102A of FIG. 2A, except that T configuration 102B replaces cover plate 208-3 with a hub portion 206-3 that cooperates with side opening 214-3 to allow wires to pass into body portion 202 through opening 214-3. In this arrangement, for example, wires may pass through three openings of body portion 202.

Figure 1C:
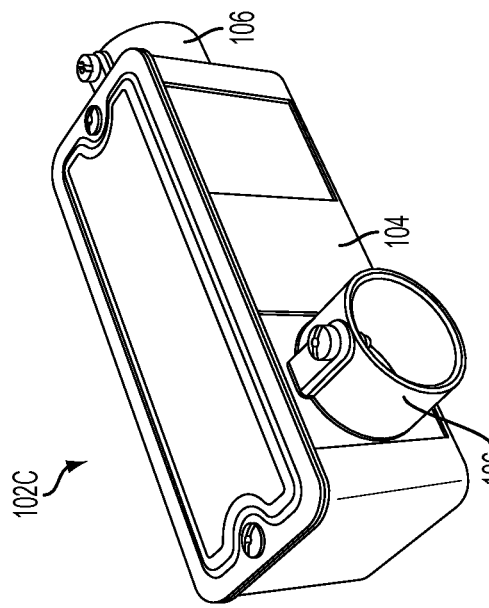
Figure 2C:
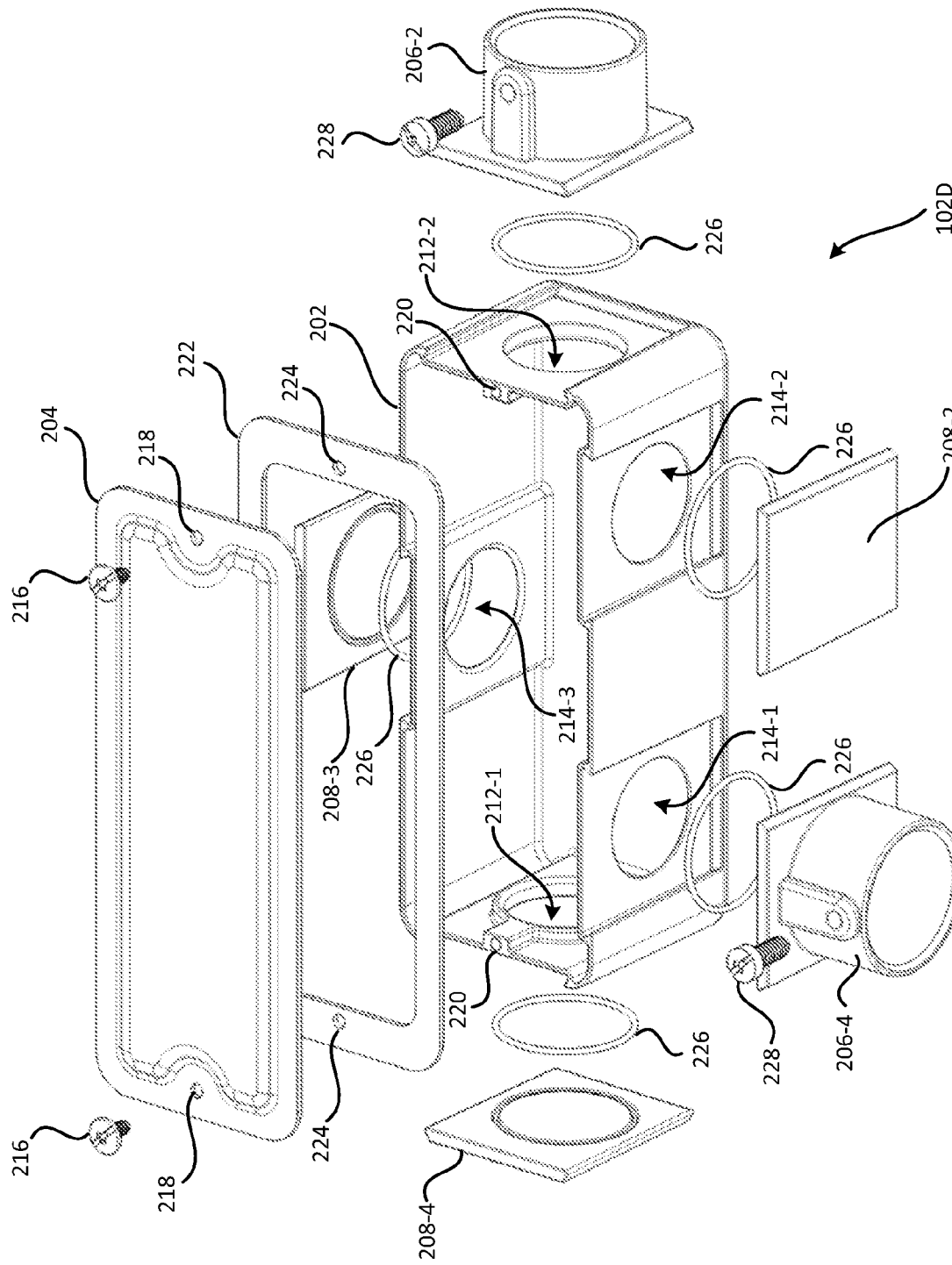

FIG. 2C is a projection drawing of the exemplary conduit body, in an unassembled state, in turn-left configuration 102C of FIG. 1C. Turn-left configuration 102C is similar to pass-forward configuration 102A of FIG. 2A, except that turn-left configuration 102B replaces cover plate 208-1 with a hub portion 206-4 that cooperates with side opening 214-1 to allow wires to pass into body portion 202. Further, turn-left configuration 102B includes a cover plate 208-4 that covers end opening 212-1. In this arrangement, for example, wires may pass through two openings of body portion 202, e.g., in directions that are ninety degrees apart.

Figure 2D:
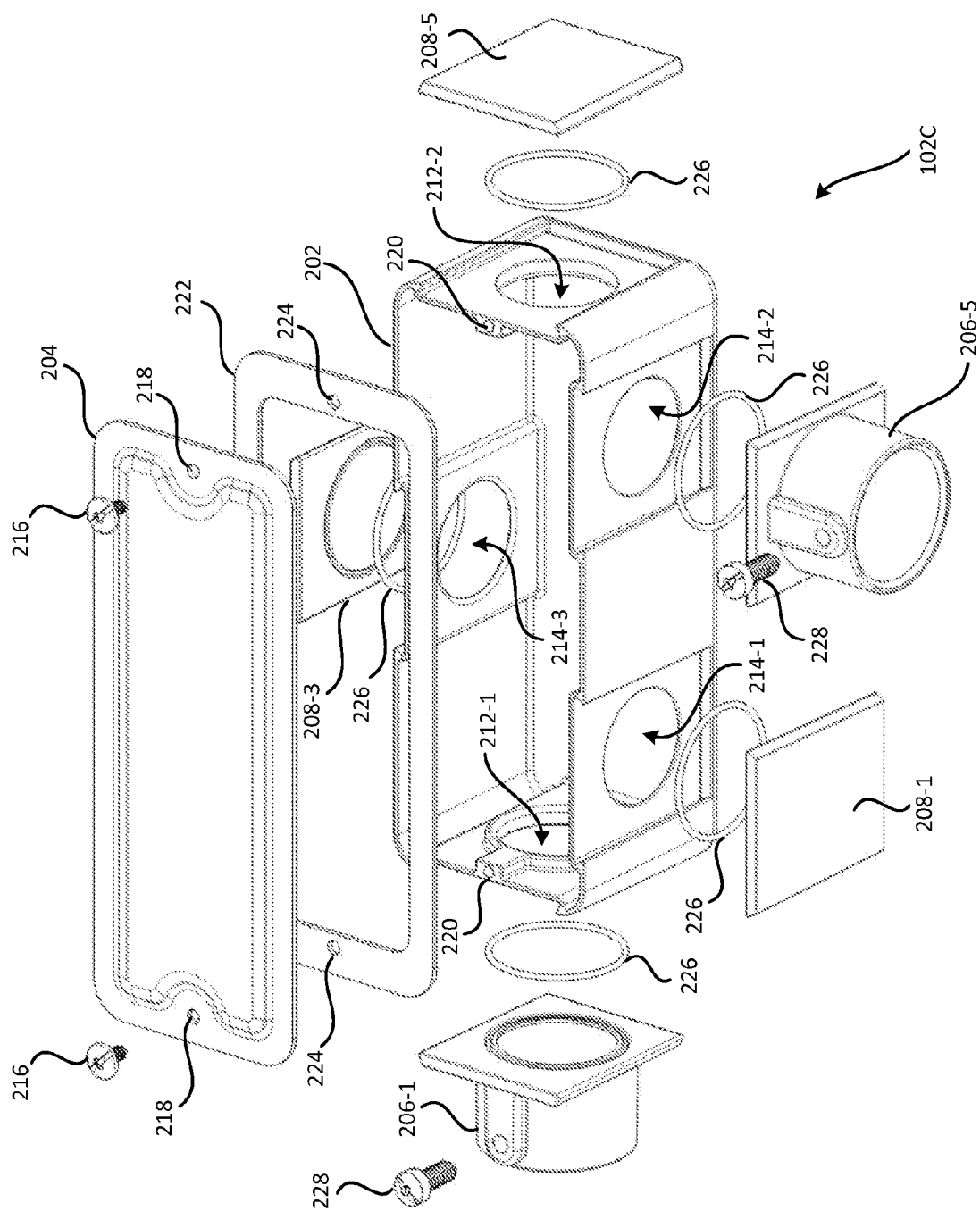

FIG. 2D is a projection drawing of the exemplary conduit body, in an unassembled state, in the turn-right configuration 102D of FIG. 1D. Turn-right configuration 102D is similar to pass-forward configuration 102A of FIG. 2A, except that turn-right configuration 102D replaces cover plate 208-2 with a hub portion 206-5 that cooperates with side opening 214-2 to allow wires to pass into body portion 202. Further, turn-right configuration 102D includes a cover plate 208-5 that covers end opening 212-2. In this arrangement, for example, wires may pass through two openings of body portion 202, e.g., in directions that are ninety degrees apart.

FIG. 3A is a projection drawing of body portion 202. FIGS. 3B, 3C, and 3D are projection drawings of body portion 202 from one end, from above, and from a side, respectively. As shown in FIGS. 3A-3D, end openings 212 and side openings 214 may be situated on recessed portions 302 of body portion 202 (e.g., recessed relative to side or outer portions 304 of body portion 202). Recessed portions 302 and side portions 304 may form grooves 306. In one embodiment, any two grooves 306 adjacent the same recessed portion 302 may be configured to receive cover plate 208 or hub portion 206. Grooves 306 may be spaced apart by a distance 308 at the top of grooves 306 and a distance 310 at the bottom of grooves 306 (see FIG. 3B). In one embodiment, distance 308 is larger than distance 310. In this embodiment, grooves 306 may receive cover plate 208 or hub portion 206 in only one direction as described below.

Body portion 202 may include a bottom 312. Opposite bottom 312, body portion 202 includes a top opening 210. Body portion 202 may include a cavity formed, for example, by bottom 312, side portions 304, and recessed portions 302. Cables may pass into the cavity through, for example, openings 212 and 214. An operator may access the cavity through, for example, top opening 210.

FIGS. 4A and 4B are projection drawings from the front side and rear side, respectively, of cover plate 208. FIGS. 4C, 4D, and 4E are projection drawings of cover plate 208 from the rear, side, and bottom, respectively. As shown in FIGS. 4A through 4E, cover plate 208 may include tapered edges 402, such that a rear surface 404 may be wider than a front surface 406 of cover plate 208.

Rear surface 404 of cover plate 208 may also include a circular recess 408 to receive o-ring 226. Recess 408 may hold o-ring 226 such that o-ring protrudes from rear surface 404 of cover plate 208. The circumference of recess 408 and o-ring 226 may be substantially similar and larger than end openings 212 and side openings 214 of body portion 202. In this embodiment, o-ring 226 may be compressed between cover plate 208 and body portion 202 to provide a seal (e.g., a water-tight seal).

In one embodiment, the length of a top edge 418 of cover plate 208 may be longer than the length of a bottom edge 420 of cover plate 208. In this embodiment, cover plate 208 may be received by grooves 306 of body portion 202 in only one direction. That is, the length of bottom edge 420 may correspond to distance 310 and the length of top edge 418 may correspond to distance 308. In this embodiment, if cover plate 208 were slid into grooves 306 leading with top edge 418 (rather than bottom edge 420), then the movement of cover plate 208 may be restricted by grooves 306 and cover plate 208 may not be able to fully occupy the space between grooves 306.

FIGS. 5A and 5B are projection drawings from the front side and rear side, respectively, of hub portion 206. FIGS. 5C, 5D, and 5E are projection drawings of hub portion 206 from the top, rear, and side, respectively. As shown in FIGS. 5A through 5E, hub portion 206 may include tapered edges 502, such that a rear surface 504 may be wider than a front surface 506 of hub portion 206.

Like cover plate 208, rear surface 504 of hub portion 206 may include a circular recess 508 to receive o-ring 226. Recess 508 may hold o-ring 226 such that o-ring protrudes from rear surface 504 of hub portion 206. The circumference of recess 508 and o-ring 226 may be substantially similar and larger than end openings 212 and side openings 214 of body portion 202. In this embodiment, o-ring 226 may be compressed between hub portion 206 and body portion 202 to provide a seal (e.g., a water-tight seal).

Hub portion 206 may include annular portion 510 that extend outward from front surface 506. Annular portion 510 forms a channel 512 extending from front surface 506 to rear surface 504 of hub portion 206. As described above, electrical wires (not shown) may pass through a channel 512 from a conduit (not shown) (e.g., rigid conduit or electrical metal tubing (EMT)) coupled to hub 506. A rib 514 may extend along annular portion 510 to provide strength to annular portion 510. Rib 514 may include a screw hole 516 to receive screw 228 for securing a conduit to hub 106. Rib 514 may also provide structural strength such that screw 228 may be tightened to secure the conduit. In one embodiment, annular portion 510 may include inner threads (not shown) along channel 512 that mate with external threads of the conduit. In this embodiment, the mating threads may help secure the conduit to hub 106.

In one embodiment, the length of a top edge 518 of hub portion 206 may be longer than the length of a bottom edge 520 of hub portion 206. In this embodiment, hub portion 206 may be received by grooves 306 of housing portion 202 in only one direction. That is, the length of bottom edge 520 may correspond to distance 310 and the length of top edge 518 may correspond to distance 308. In this embodiment, if hub portion 206 were slid into grooves 306 leading with top edge 518 (rather than bottom edge 520), then the movement of hub portion 306 may be restricted by grooves 306 and hub portion 206 may not be able to fully occupy the space between grooves 306.

Figure 6A:
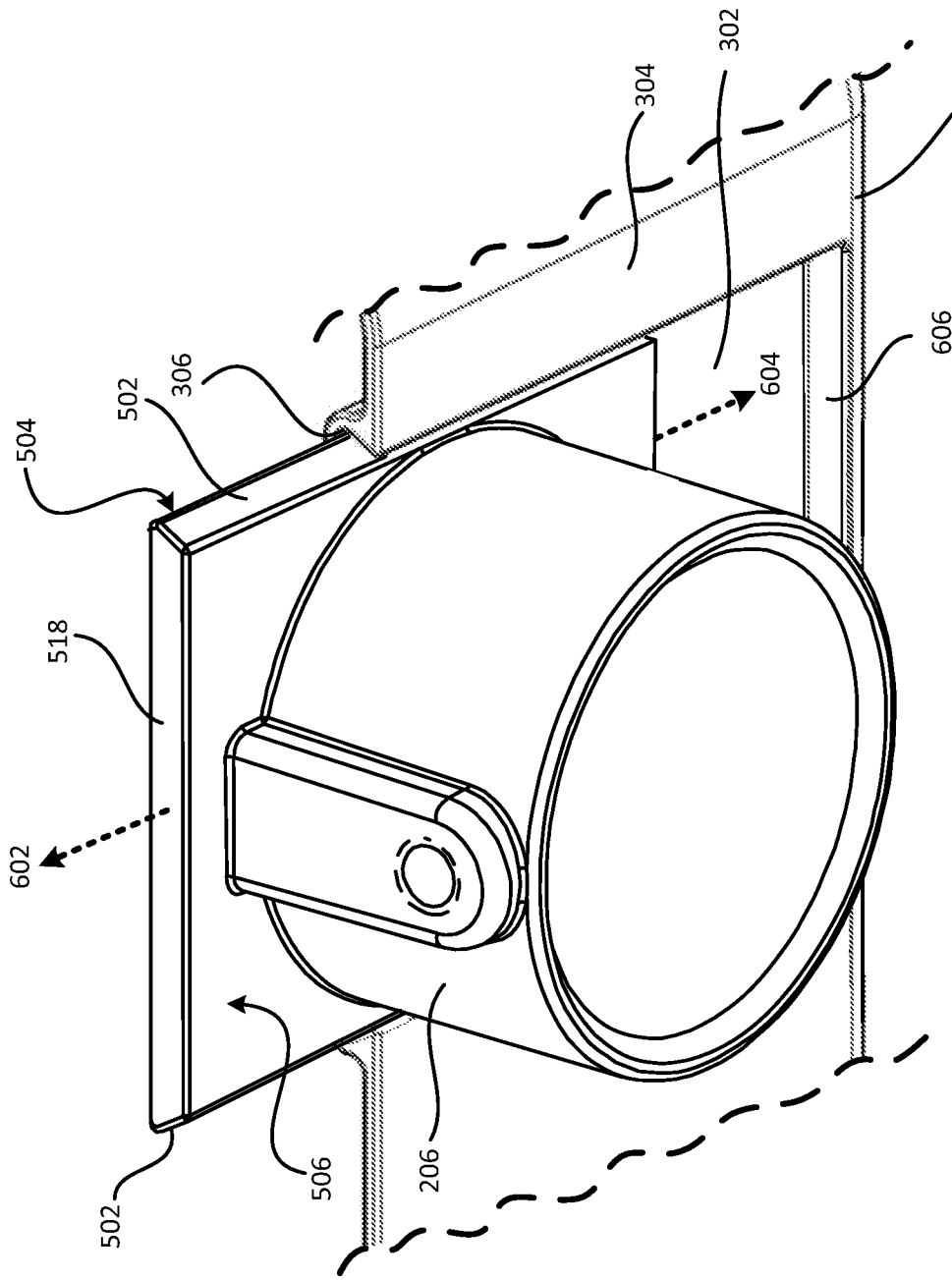
FIGS. 6A and 6B are projection drawings of an exemplary coupling of the hub portion and body portion of the conduit bodies shown in FIGS. 2A through 2D.

FIG. 6A is a projection drawing of an exemplary partial coupling of hub portion 206 to body portion 202. As shown in FIG. 6A, tapered edges 502 of hub portion 206 may fit into grooves 306 of body portion 202. Hub portion 206 has been partially moved (e.g., slid) into body portion 202 and occupies a portion of the space bound by recessed portion 302 and grooves 306. In the embodiment shown, rear surface 504 (see FIG. 5B) at top edge 518 of hub portion 206 may be wider than edge-to-edge distance 308 and/or edge-to-edge distance 310 between grooves 306. As a result, hub 206 may be secured and/or coupled to body portion 202 such that hub 206 may move in an upward direction 602 (e.g., in a linear direction) or in a downward direction 604 (e.g., in a linear direction) but may be restrained from moving in other directions (e.g., outward or from side to side).

Figure 6B:
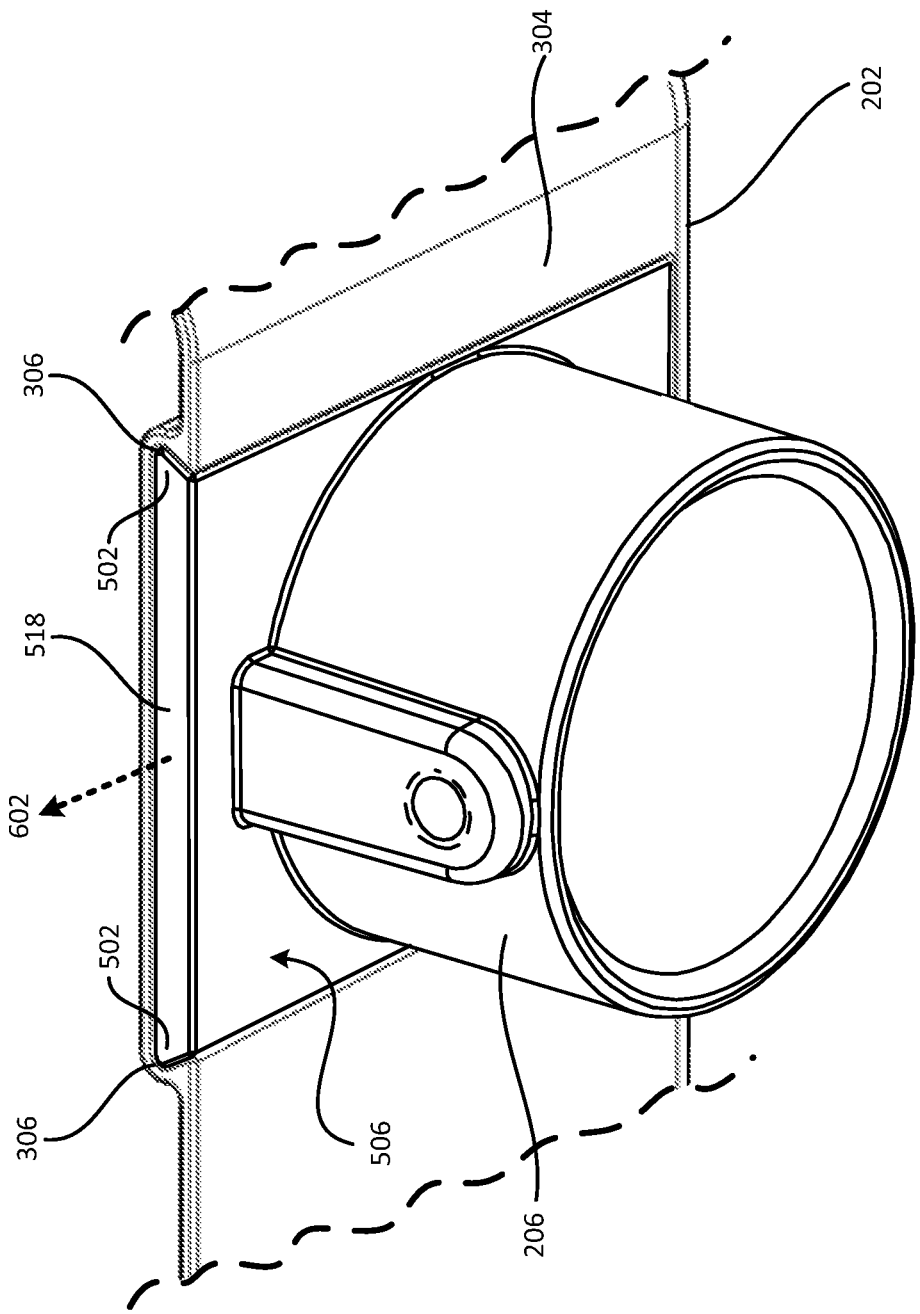

FIG. 6B is a projection drawing of an exemplary full coupling of hub portion 206 to body portion 202. Consistent with FIG. 6A, tapered edges 502 of hub portion 206 may fit into grooves 306 of body portion 202. As shown in FIG. 6B, hub portion 206 has been moved (e.g., slid) into body portion 202 and occupies the full space bound by recessed portion 302 and grooves 306. Hub portion 206 may be restrained from further movement in direction 604 by, for example, bottom edge 520 of hub portion 206 abutting against a lower surface 606 (see FIG. 6A) of body portion 202. Rear surface 504 (see FIG. 5B) at top edge 518 of cover plate 208 may be wider than edge-to-edge distance 308 and/or edge-to-edge distance 310 between grooves 306. As a result, hub portion 206 may be secured to body portion 202 such that hub portion 206 may move upward in direction 602 (e.g., in a linear direction) but may be restrained from movement in other directions (e.g., outward or from side to side). In one embodiment, hub portion 206 may also be restrained from moving in direction 602 by, for example, securing top plate 204 to body portion 202 with screws 216.

Figure 6C:
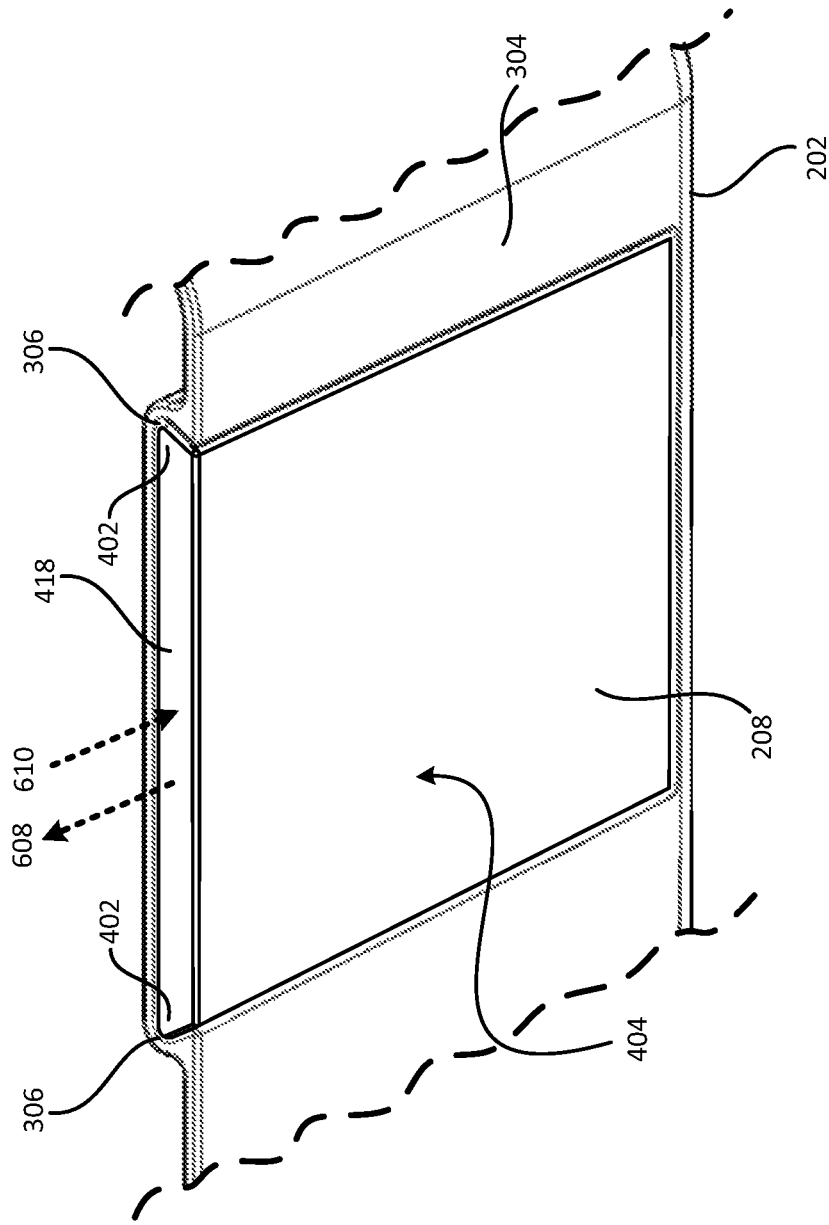
FIG. 6C is a projection drawing of an exemplary coupling of the cover plate and body portion of the conduit bodies shown in FIGS. 2A through 2D.

FIG. 6C is a projection drawing of an exemplary coupling of cover plate 208 to body portion 202. As shown in FIG. 6C, tapered edges 402 of cover plate 208 may fit into grooves 306 of body portion 202. As with hub portion 206 shown in FIGS. 6A and 6B, cover plate 208 may slide into body portion 202 and occupy the space bound by recessed portion 302 and grooves 306. Rear surface 404 (see FIG. 4B) at top edge 418 of cover plate 208 may be wider than edge-to-edge distance 308 and/or edge-to-edge distance 310 between grooves 306. As a result, cover plate 208 may be secured to body portion 202 such that cover plate 208 may move in an upward direction 608 (e.g., a linear direction) from the position shown in FIG. 6C, but may be restrained in other directions (e.g., outward or from side to side). In this embodiment, once cover plate 208 is moved in direction 608, it may return the position shown in FIG. 6C by moving cover plate 208 in a direction 610 (e.g., a linear direction). In one embodiment, cover plate 208 may also be restrained from moving in direction 608 by, for example, securing top plate 204 to body portion 202 with screws 216. Cover plate 208 may be restrained from further movement in direction 610 by, for example, bottom edge 420 of cover plate 208 abutting against a lower surface 606 (see FIG. 6A) of body portion 202.

In the embodiments above, any set of grooves 306 of body portion 202 may receive a hub (e.g., hub 206) or a cover plate (e.g., cover plate 208). Thus, the conduit body may be configured in go-forward configuration 102A, T configuration 102B, turn-left configuration 102C, or turn-right configuration 102D. Other configurations are possible (e.g., $2^5=32$ combinations of hubs and cover plates). For example, the conduit body may be configured with one hub and four cover plates (e.g., a dead-end junction box). Further, embodiments described herein may allow for a conduit body to be configured as shown in any of configurations 102A through 102D or to be reconfigured from any of the configurations 102A-102D into any other one of configurations 102A-102B. Such reconfiguration may simplify ordering, stocking, and installing conduit bodies and allow more flexibility.

Figure 7A:
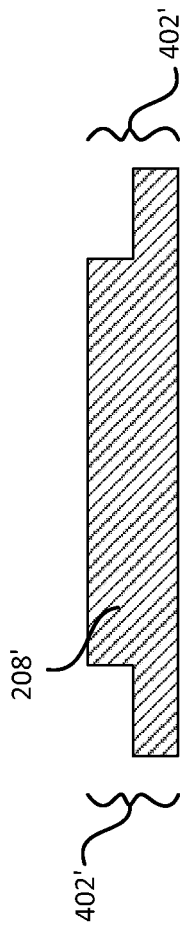
FIGS. 7A through 7C are cross sectional drawings of a cover plate and a body portion of a conduit body in another embodiment.
Figure 7B:
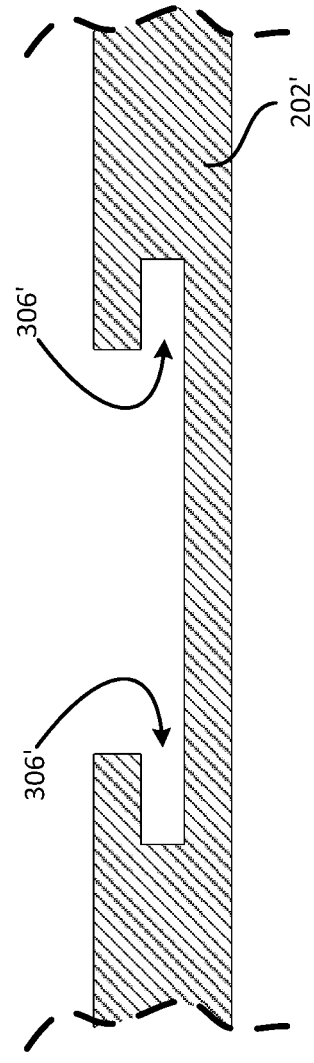
Figure 7C:
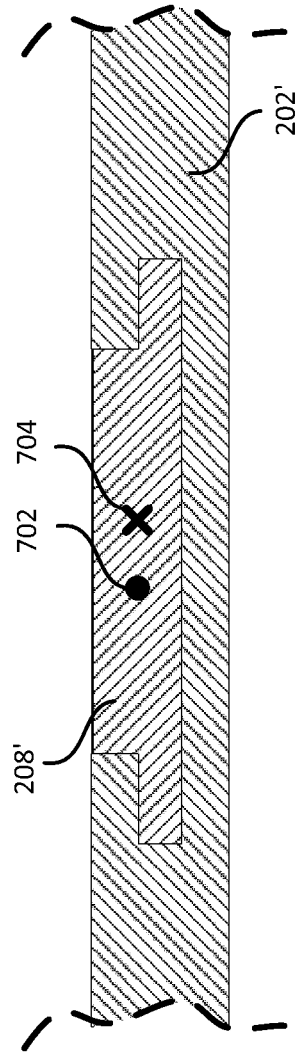

FIGS. 7A, 7B, and 7C are cross sectional drawings of an alternative cover plate 208', an alternative body portion 202', and an alternative coupling between cover plate 208' and body portion 202'. As shown in FIG. 7A, cover plate 208' may include a stepped edge 402' rather than a tapered edge (e.g., tapered edge 402). As shown in FIG. 7B, grooves 306' may be stepped as well to match edges 402'. Finally, as shown in FIG. 7C, cover plate 208' may be coupled (e.g., slidably coupled) to body portion 202' such that cover plate 208' may move in a direction 702 or a direction 704.

Figure 8A:
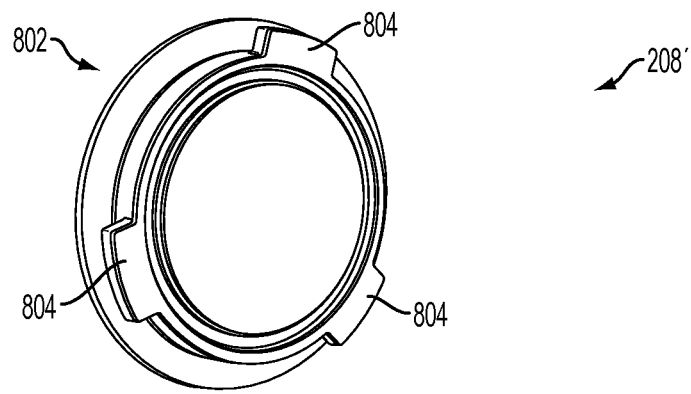
FIGS. 8A through 8D are projection drawings of a cover plate, a hub portion, and a body portion of a conduit body in another embodiment.
Figure 8B:
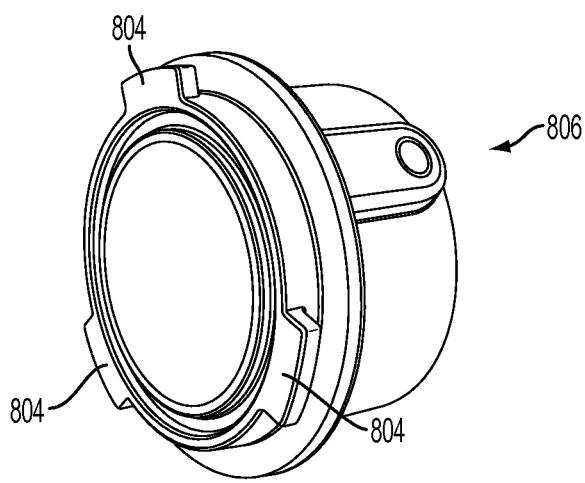
Figure 8C:
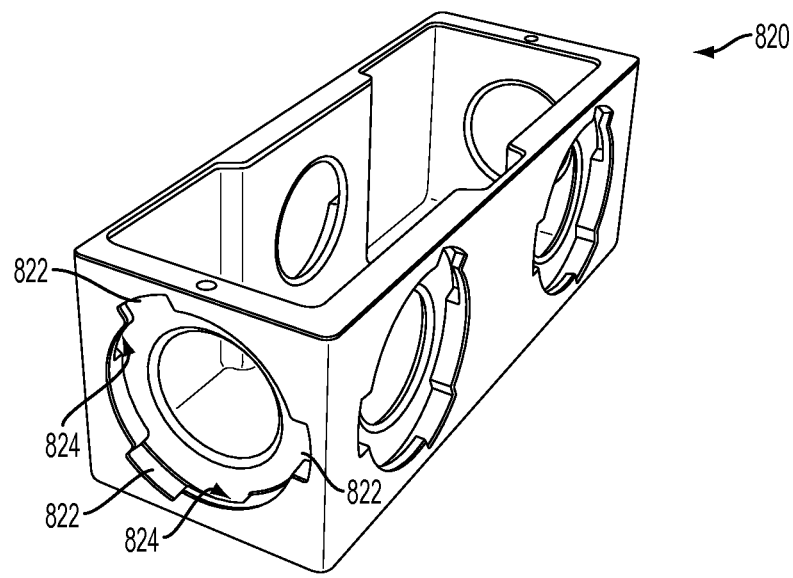

FIGS. 8A and 8B are projection drawings of an alternative cover plate 802 and an alternative hub portion 806. As shown in FIG. 8A, cover plate 802 may include a number of tabs 804 (e.g., three tabs). Likewise, hub portion 806 may include a number of tabs 804 (e.g., also three tabs). Tabs 804 may operate to couple cover plate 802 and/or hub portion 804 to a body portion of a conduit body, for example. For example, FIG. 8C is a projection drawing of an alternative body portion 820. In this embodiment, body portion 820 may include slots 822 that match tabs 804 and may receive tabs 804. Body portion 820 may also include grooves 824 in which tabs 804 may rotatably slide, for example, after slots 822 receive tabs 804. Thus, hub 806 and/or cover plate 802 may be received and/or secured by slots 822 and/or grooves 824. Grooves 824 may include recesses and/or projections to secure hub portion 806 and/or cover plate 802 once rotated.

Figure 8D:
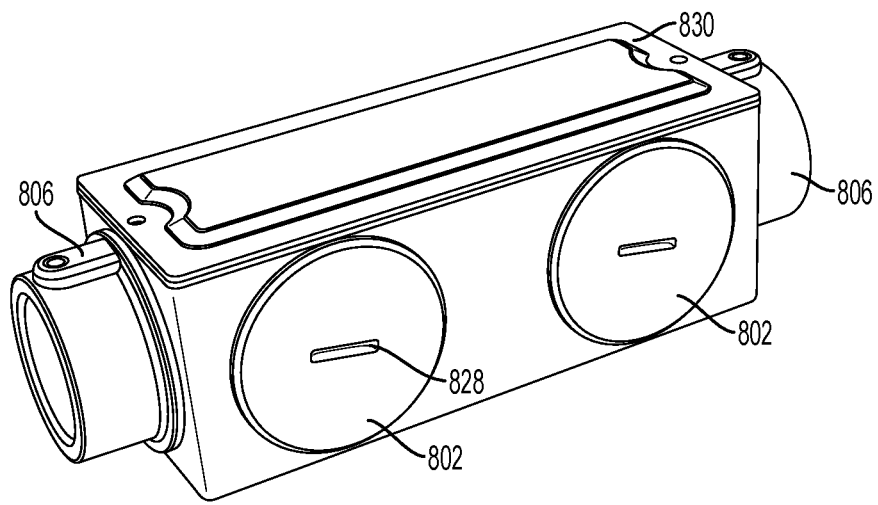

FIG. 8D is a projection drawing of body portion 820, hub portion 806, and cover plate 802 in an assembled configuration. As shown, cover plate 802 may include a slot 828 to receive the head of a screw driver, for example, to facilitate rotation of tabs 804 through grooves 824. As also shown in FIG. 8D, a top plate 830 may cover the cavity of body portion 820. Comparing tabs 804 of hub portion 806 in FIG. 8B, to grooves 822 of conduit body 820 in FIG. 8C, and hub portion 806 of FIG. 8D, hub portion 806 was rotated approximately ninety degrees into the position shown in FIG. 8C. In this embodiment, although FIG. 8D shows the connector body in a pass-forward configuration, at least any of the configurations shown in FIGS. 1A-1D are possible.

FIG. 9A is a cross-sectional diagram of an exemplary conduit body 902 in another embodiment. Conduit body 902 may include a body portion 904, a hub portion 906, and a clip 908. In this embodiment, hub portion 906 may include a flange 912 and a flange 914. Flange 912 and 914 may form a groove therebetween. Hub portion 906 may be slid (in a direction 928) onto body portion 904 such that part of body portion 904 becomes situated in the groove formed by flange 912 and flange 914. As shown in FIG. 9A, movement of hub portion 906 in a direction 920 (e.g., a linear direction) may be restricted by, for example, flange 912. Movement of hub portion 906 in a direction 922 (e.g., a linear direction) may be restricted by, for example, flange 914.

FIG. 9B is a projection drawing of clip 908 from one side and FIG. 9C is a projection drawing of clip 908 from another side. As shown in FIG. 9B, clip 908 may include two legs 911 that create a space 910 therebetween. As shown in FIG. 9A, legs 911 of clip 908 may surround hub portion 906. Returning to FIG. 9B, clip 908 may also include a top flange 916. In this embodiment, clip 908 may be situated between flange 912 of hub 906 and body portion 904. In this position, clip 908 may tighten and seal hub portion 906 against body portion 904 (e.g., flange 914 against body portion 904). Further, in combination with a top plate (not shown), movement of hub portion 906 in a direction 926 may be restricted.

Figure 10A:
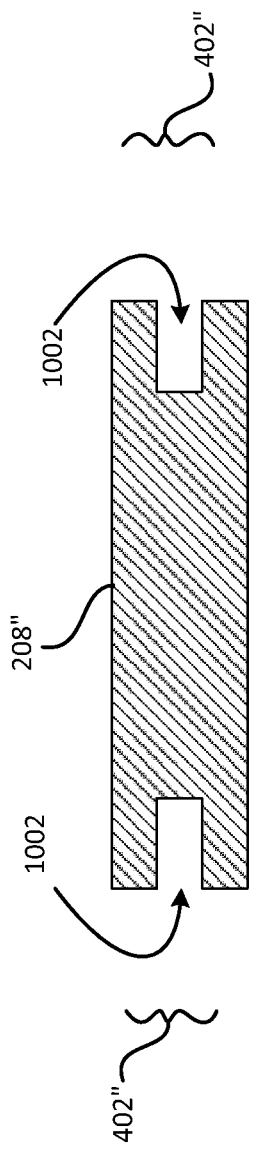
FIGS. 10A through 10C are cross sectional drawings of a cover plate and a body portion of a conduit body in another embodiment.
Figure 10B:
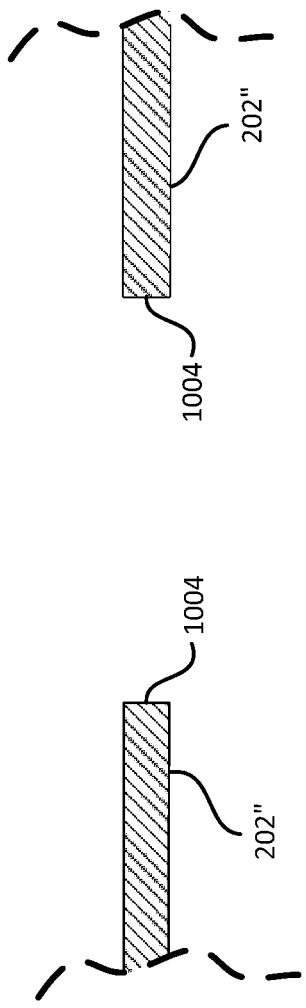
Figure 10C:
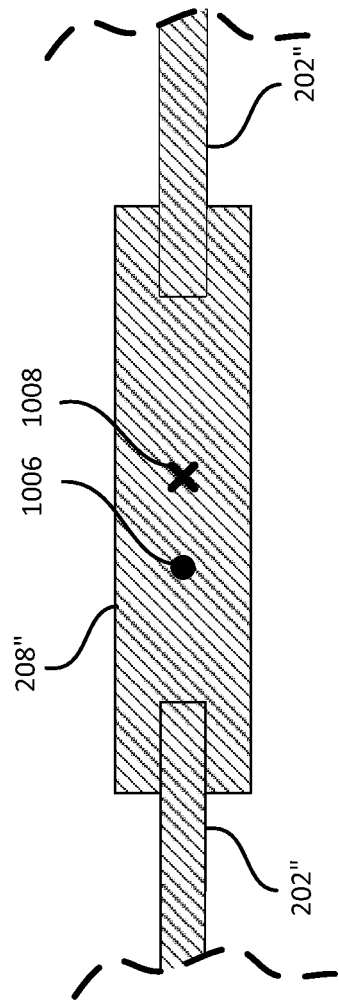

FIGS. 10A, 10B, and 10C are cross sectional drawings of an alternative cover plate 208", an alternative body portion 202", and an alternative coupling between cover plate 208" and body portion 202". As shown in FIG. 10A, cover plate 208" may include grooved edges 402" (including grooves 1002) rather than tapered edges (e.g., tapered edges 402). As shown in FIG. 10B, body portion 202" may include edges 1004 that match grooved edges 402" of cover plate 208". Finally, as shown in FIG. 10C, cover plate 208" may be coupled (e.g., slidably coupled) to body portion 202" such that cover plate 208″ may move in a direction 1006 (e.g., a linear direction) or a direction 1008 (e.g., also a linear direction).

Terms such as "top," "bottom," "forward," and "rear" are used in the above description. These terms are meant to be relative, e.g., a "top" side is opposite a "bottom" side. These terms are not intended to be absolute where a "top" side is necessarily always above the "bottom" side.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A conduit body comprising:
   a body portion including at least one side and a bottom to form a cavity, wherein the side includes an outer surface and a recessed surface,
      wherein the outer surface includes a first outer surface and a second outer surface forming a gap between an edge of the first outer surface and an edge of the second outer surface;
      wherein the recessed surface extends substantially across the gap and forms a set of grooves between the recessed surface and the first and second outer surfaces, wherein the recessed surface includes an opening into the cavity to receive a cable, and wherein the recessed surface fully surrounds the opening into the cavity; and
   a hub portion including an annular tube forming an opening to receive the cable, wherein the hub portion includes a plurality of edges,
      wherein the body portion is configured to receive the edges of the hub portion in the grooves such that movement of the hub portion in a linear direction moves the hub portion through the grooves and couples the hub portion to the body portion, and
      wherein when the hub portion is coupled to the body portion using the grooves, the conduit body is configured to receive the cable through the annular tube of the hub portion and through the opening in the recessed surface into the cavity.

2. The conduit body of claim 1, further comprising:
   a cover plate including a plurality of edges, wherein the cover plate is configured to cover the opening in the recessed surface,
   wherein the body portion is configured to receive the edges of the cover plate in the grooves such that movement of the cover plate in a linear direction moves the cover plate through the grooves and couples the cover plate to the body portion, and
   wherein when the cover plate is coupled to the body portion using the grooves, the cover plate covers the opening in the recessed surface.

3. The conduit body of claim 2, wherein the recessed surface is a first recessed surface, the gap is a first gap, the set of grooves is a first set of grooves, and the opening is a first opening,
   wherein the outer surface includes a third outer surface and a fourth outer surface forming a second gap between an edge of the third outer surface and an edge of the fourth outer surface;
   wherein the body portion includes a second recessed surface in a plane different than the third outer surface and the fourth outer surface, wherein the second recessed surface extends across the second gap and forms a second set of grooves between the third and fourth outer surfaces and the second recessed surface, wherein the second recessed surface includes a second opening into the cavity for passing a cable,
   wherein the body portion is configured to receive the edges of the hub portion in the second set of grooves such that movement of the hub portion in a linear direction moves the hub portion through the second set of grooves and couples the hub portion to the body portion,
   wherein when the hub portion is coupled to the body portion using the second set of grooves, the conduit body is configured to receive the cable through the annular tube of the hub portion and through the second opening in the second recessed surface into the cavity,
   wherein the body portion is configured to receive the edges of the cover plate in the second set of grooves such that movement of the cover plate in a linear direction moves the cover plate through the second set of grooves and couples the cover plate to the body portion, and
   wherein when the cover plate is coupled to the body portion using the second set of grooves, the cover plate covers the second opening in the recessed surface.

4. The conduit body of claim 3, wherein the edges of the hub portion include tapered edges.

5. The conduit body of claim 1, wherein the body portion includes a top opening into the cavity opposite the bottom, the conduit body further comprising:
   a top plate configured to couple to the body portion and cover the top opening, wherein the top plate is configured to secure the hub portion in the grooves of the body portion.

6. The conduit body of claim 1,
   wherein the annular tube of the hub portion is configured to be coupled to a conduit for receiving the cable, and
   wherein the recessed surface surrounds 360 degrees of the opening into the cavity.

7. A device comprising:
   a body portion including at least one side and a bottom to form a cavity, wherein the side includes an outer surface and a recessed surface,
      wherein the outer surface includes a first outer surface and a second outer surface forming a gap between an edge of the first outer surface and an edge of the second outer surface;
      wherein the recessed surface is in a plane different than but substantially parallel to the first outer surface and the second outer surface, wherein the recessed surface extends into the gap and forms a set of grooves between the recessed surface and the first and second outer surfaces, wherein the recessed surface includes an opening into the cavity for passing a cable, and wherein the recessed surface fully surrounds the opening into the cavity,
      wherein the body portion is configured to receive a plurality of edges of a hub portion in the grooves such that movement of the hub portion in a linear direction moves the hub portion through the grooves and couples the hub portion to the body portion, and wherein when the hub portion is coupled to the body portion using the grooves, the body portion is configured to receive a cable through an annular tube of the hub portion and through the opening in the recessed surface into the cavity.

8. The device of claim 7, wherein the body portion is configured to receive the edges of a cover plate in the grooves such that movement of the cover plate in a linear direction moves the cover plate through the grooves and couples the cover plate to the body portion;

wherein when the cover plate is coupled to the body portion using the grooves, the cover plate covers the opening in the recessed surface, wherein the recessed surface surrounds 360 degrees of the opening into the cavity, and wherein the recessed surface extends substantially across the gap.

9. The device of claim 8, wherein the recessed surface is a first recessed surface, the gap is a first gap, the set of grooves is a first set of grooves, and the opening is a first opening, wherein the outer surface includes a third outer surface and a fourth outer surface forming a second gap between an edge of the third outer surface and an edge of the fourth outer surface;

wherein the body portion includes a second recessed surface in a plane different than the third outer surface and the fourth outer surface, wherein the second recessed surface extends across the second gap and forms a second set of grooves between the third and fourth outer surfaces and the second recessed surface, wherein the second recessed surface includes a second opening into the cavity for passing a cable;

wherein the body portion is configured to receive the edges of the hub portion in the second set of grooves such that movement of the hub portion in a linear direction moves the hub portion through the second set of grooves and couples the hub portion to the body portion, wherein when the hub portion is coupled to the body portion using the second set of grooves, the body portion is configured to receive the cable through the annular tube of the hub portion and through the second opening in the second recessed surface into the cavity, wherein the body portion is configured to receive the edges of the cover plate in the second set of grooves such that movement of the cover plate in a linear direction moves the cover plate through the second set of grooves and couples the cover plate to the body portion, and wherein when the cover plate is coupled to the body portion using the second set of grooves, the cover plate covers the second opening in the recessed surface.

10. The device of claim 8, wherein the body portion includes a top opening into the cavity opposite the bottom, wherein the body portion is configured to receive a top plate configured to cover the top opening, wherein the top plate secures the hub portion in the grooves of the body portion.

11. The device of claim 10, further comprising the hub portion, the cover plate, and the top plate.

12. The device of claim 8, wherein the edges of the hub portion and the cover plate include tapered edges.

13. A method comprising:

sliding, in a linear direction, edges of a hub portion in grooves of a body portion to couple the hub portion to the body portion, wherein the body portion includes at least one side and a bottom to form a cavity, wherein the side includes an outer surface, wherein the outer surface includes a first outer surface and a second outer surface forming a gap between an edge of the first outer surface and an edge of the second outer surface, wherein the body portion includes a recessed surface in a plane different than the first outer surface and the second outer surface, wherein the recessed surface extends across the gap and forms the grooves between the first and second outer surfaces and the recessed surface, wherein the recessed surface includes an opening into the cavity for passing a cable, wherein the recessed surface fully surrounds the opening into the cavity, wherein the hub portion includes an annular tube forming an opening to receive the cable, wherein the hub portion includes a plurality of edges, and wherein when the hub portion is coupled to the body portion using the grooves, wherein the hub portion and body portion are configured to receive a cable through the annular tube of the hub portion and through the opening in the recessed surface into the cavity.

14. The method of claim 13, wherein the recessed surface is a first recessed surface, the gap is a first gap, grooves are a first set of grooves, the opening is a first opening, and wherein the outer surface includes a third outer surface and a fourth outer surface forming a second gap between an edge of the third outer surface and an edge of the fourth outer surface, the method further comprising:

sliding, in a linear direction, edges of a cover plate in a second set of grooves of the body portion to couple the cover plate to the body portion, wherein the body portion includes a second recessed surface in a plane different than the third outer surface and the fourth outer surface, wherein the second recessed surface extends across the second gap and forms the second set of grooves between the outer surface and the second recessed surface, wherein the second recessed surface includes a second opening into the cavity for passing a cable, wherein when the cover plate is coupled to the body portion using the second set of grooves, the cover plate covers the opening in the recessed surface.

15. The method of claim 14, wherein the edges of the hub portion and the cover plate include tapered edges.

16. The method of claim 13, wherein the body portion includes a top opening into the cavity opposite the bottom, the method further comprising:

coupling a top plate to the body portion to cover the top opening, wherein the top plate secures the hub portion in the grooves of the body portion.

17. The method of claim 13, further comprising:

coupling a conduit to the annular tube of the hub portion for receiving the cable into the hub portion, wherein the recessed surface surrounds 360 degrees of the opening into the cavity, and wherein the recessed surface extends substantially across the gap.

18. The conduit body of claim 1, wherein the recessed surface extends entirely across the gap and completely surrounds the opening into the cavity, wherein when the hub portion includes a rear surface having a recess configured to receive an O-ring, and wherein when the hub portion is coupled to the body portion, the rear surface of the hub portion mates with the recessed surface and compresses the O-ring to form a seal.

19. The device of claim 7,
wherein the recessed surface extends entirely across the gap and completely surrounds the opening into the cavity,
wherein the hub portion includes a rear surface having a recess configured to receive an O-ring, and
wherein when the hub portion is coupled to the body portion, the rear surface of the hub portion mates with the recessed surface and compresses the O-ring to form a seal.

20. The method of claim 13,
wherein the recessed surface extends entirely across the gap and completely surrounds the opening into the cavity, and
wherein the hub portion includes a rear surface having a recess configured to receive an O-ring, and
wherein when the hub portion is coupled to the body portion, the rear surface of the hub portion mates with the recessed surface and compresses the O-ring to form a seal.

* * * * *